(12) United States Patent
Schwiedernoch et al.

(10) Patent No.: US 11,866,835 B2
(45) Date of Patent: Jan. 9, 2024

(54) ELECTROCHEMICAL METHOD FOR PREPARING AN AMINE AND/OR A NITRILE

(71) Applicant: RHODIA OPERATIONS, Lyons (FR)

(72) Inventors: Renate Schwiedernoch, Shanghai (CN); Fan Jiang, Shanghai (CN); Stephane Streiff, Paris (FR); Pascal Metivier, Paris (FR); Dominique Horbez, Paris (FR)

(73) Assignee: RHODIA OPERATIONS, Lyons (FR)

( * ) Notice: Subject to any disclaimer, the term of this patent is extended or adjusted under 35 U.S.C. 154(b) by 0 days.

(21) Appl. No.: 17/779,945

(22) PCT Filed: Nov. 25, 2019

(86) PCT No.: PCT/CN2019/120510
§ 371 (c)(1),
(2) Date: May 25, 2022

(87) PCT Pub. No.: WO2021/102611
PCT Pub. Date: Jun. 3, 2021

(65) Prior Publication Data
US 2023/0002918 A1 Jan. 5, 2023

(51) Int. Cl.
*C25B 3/09* (2021.01)
*C25B 3/23* (2021.01)
*C25B 11/042* (2021.01)

(52) U.S. Cl.
CPC .............. *C25B 3/09* (2021.01); *C25B 3/23* (2021.01); *C25B 11/042* (2021.01)

(58) Field of Classification Search
CPC .................................. C25B 3/09; C25B 3/23
USPC ................................................ 205/431, 433
See application file for complete search history.

(56) References Cited

U.S. PATENT DOCUMENTS

2009/0159451 A1* 6/2009 Tomantschger ......... C25D 1/00
205/148

FOREIGN PATENT DOCUMENTS

JP      2015010253 A   *  1/2015   ............. C25B 11/06
KR   20180072494 A   *  6/2018   ............. C22C 38/08

OTHER PUBLICATIONS

Matthessen et al., "Decarboxylation of a Wide Range of Amino Acids with Electrogenerated Hypobromite," European Journal of Organic Chemistry (Oct. 2014), vol. 2014, No. 30, pp. 6649-6652. (Year: 2014).*
MacDonald .et. al., Electrochemical oxidation reactions of tyrosine, tryptophan and related dipeptides, Electrochimica Acta (1997), 42(8), 1189-1200 (12 pages).
Kobayashi .et. al., Electrochemical oxidative decomposition of cyclic amino acids, Nippon Kagaku Kaishi (1999), (4), 231-235 (5 pages).
Huang .et. al., New Oscillatory Electrocatalytic Oxidation of Amino Compounds on a Nanoporous Film Electrode of Electrodeposited Nickel Hydroxide Nanoflakes, Journal of Physical Chemistry C (2007), 111(45), 16902-16908 (7 pages).
Lut .et. al., Electrochemical oxidation of amino acids at a platinum electrode in alkaline solutions, Ukrainskii Khimicheskii Zhurnal (Russian Edition) (2008), 74(3-4), 97-100 (6 pages).
Matthessen .et. al., Decarboxylation of a Wide Range of Amino Acids with Electrogenerated Hypobromite, European Journal of Organic Chemistry, Jan. 1, 2014, vol. 2014 (30), 6649-6652 (4 pages).
Dai .et. al., Electrochemical Synthesis of Adiponitrile from the Renewable Raw Material Glutamic Acid, ChemSusChem2012, 5, 617-620 (4 pages).
Shao .et. al., Decarboxylative C sp 3-N Bond Formation by Electrochemical Oxidation of Amino Acids, Org. Lett. 2019, 21, 22, 9262-9267 (6 pages).
Matthesen .et. al., Electrocarboxylation: towards sustainable and efficient synthesis of valuable carboxylic acids, Beilstein J. Org. Chem. 2014, 10, 2484-2500 (17 pages).
Kim .et. al., Enhanced I-Lysine into 1,5-Diaminopentane Conversion via Statistical Optimization of Whole-Cell Decarboxylation System, Polymers 2019, 11(8), 1372 (12 pages).
International Search Report issued in International Application No. PCT/CN2019/120510, dated Jul. 30, 2020 (3 pages).
Written Opinion issued in International Application No. PCT/CN2019/120510, dated Jul. 30, 2020 (4 pages).

* cited by examiner

*Primary Examiner* — Edna Wong
(74) *Attorney, Agent, or Firm* — Osha Bergman Watanabe & Burton LLP

(57) ABSTRACT

The present invention relates to an electrochemical method for converting an amino acid and/or its salts to an amine and/or a nitrile. The total yield and selectivity of amine and nitrile obtained by the method according to the present invention is higher than prior art when the reaction medium has a high concentration of amino acid and/or its salts at the beginning of the reaction.

12 Claims, No Drawings

ELECTROCHEMICAL METHOD FOR PREPARING AN AMINE AND/OR A NITRILE

TECHNICAL FIELD

The present invention relates to a method for preparing an amine and/or a nitrile by an electrochemical reaction.

BACKGROUND

Amines are of significant importance for the chemical industry. Numerous amines and their derivatives are used as agrochemicals, pharmaceuticals, or food additives. Several million tons of amines are produced annually. They are widely used in both the bulk and fine chemical industries as fundamental materials, additives, dyes, and agrochemicals.

Diamines are used as monomers to prepare polyamides, polyimides, and polyureas. For example, the five carbon compound 1, 5-diaminopentane receives increasing interest as platform chemical, especially as innovative building block for bio-based polymers. Nowadays, the chemical industry is in a transition from a petrochemical industry towards a more biobased industry Amino acids can be interesting starting materials for a variety of nitrogen-containing bulk chemicals after selective removal of the carboxylic group on the α-carbon atom. This nitrogen recycling avoids the repeated, energy-intensive functionalization of hydrocarbons with ammonia.

Eur. J. Org. Chem. 2014, 6649-6652 discloses decarboxylation of a wide range of amino acids with electrogenerated hypobromite. The highest total yield of aminopentanenitrile (APN) and diaminopentane (DAP) is 93% by decarboxylation of lysine. However, the concentration of the amino acid is quite low. Disadvantageously, the low concentration of reactants requires bigger reaction vessels and therefore more CAPEX in order to produce the same amount at the same time.

There is still a need to develop an industrially applicable and efficient method to prepare an amine in higher selectivity and yield under mild conditions.

SUMMARY OF THE INVENTION

The present invention therefore pertains to an electrochemical method for converting an amino acid and/or its salts to an amine and/or a nitrile in the presence of a solvent and a compound generating a mediator in reduced form in the solvent, wherein the concentration of the amino acid and/or its salts in the solvent is equal to or greater than 0.15 mol/L.

Without wishing to be bound by any theory, the total yield and selectivity of amine and nitrile obtained by the method according to the present invention is higher than prior art when the reaction medium has a high concentration of amino acid and/or its salts at the beginning of the reaction. Higher reactant concentration reduces the average cost as it increases the rates of out-put and favors large-scale production over small-scale production.

Definitions

Throughout the description, including the claims, the term "comprising one" should be understood as being synonymous with the term "comprising at least one", unless otherwise specified, and "between" should be understood as being inclusive of the limits.

As used herein, the terminology "($C_n$—$C_m$)" in reference to an organic group, wherein n and m are each integers, indicates that the group may contain from n carbon atoms to m carbon atoms per group.

As used herein, the terminology "oxidative decarboxylation" reactions are oxidation reactions in which a carboxylate or carboxylic acid group is removed, forming carbon dioxide.

As used herein, the term "anode" means the electrode from which electrons migrate to the outside circuit and is the electrode where oxidation occurs.

As used herein, the term "cathode" means the electrode to which electrons migrate from the outside circuit and is the electrode where reduction occurs.

The articles "a", "an" and "the" are used to refer to one or to more than one (i.e., to at least one) of the grammatical object of the article.

The term "and/or" includes the meanings "and", "or" and also all the other possible combinations of the elements connected to this term.

It is specified that, in the continuation of the description, unless otherwise indicated, the values at the limits are included in the ranges of values which are given.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

Details of the Invention

The upper limit of the concentration of the amino acid and/or its salts is not particularly limited. In some embodiments, it can be a saturated solution concentration, which depends on specific amino acid or salts. Preferably, the concentration of the amino acid and/or its salts in the solution is in the range of 0.15 mol/L to 2 mol/L and more preferably 0.50 mol/L to 1.0 mol/L.

It is understood that the solvent shall have good solubility for both the amino acid or its salts, and the compound generating the mediator in reduced form so that they can have sufficient contact in the solution. Such solvent can be alcohol, water or their combination. Preferably, the solvent is water.

As used herein, "mediator" is a redox substance that mediates electron transfer. In the present invention, this substance acts as electron shuttles between the oxidizing electrode and the amino acid and/or its salts. The mediator is not particularly limited as long as it can shoulder the responsibility for transferring the electron between the oxidizing electrode and the amino acid and/or its salts.

Examples of the compound generating a mediator in reduced form in the solvent are:

Alkali metal bromides, such as lithium bromide (LiBr), sodium bromide (NaBr) and potassium bromide (KBr);

Alkali metal chlorides, such as lithium chloride (LiCl), sodium chloride (NaCl) and potassium chloride (KCl);

Alkali metal iodides, such as lithium iodide (LiI), sodium iodide (NaI) and potassium iodide (KI);

Ammonium bromide ($NH_4Br$);

Iron salts, such as iron(II) sulphate ($FeSO_4$), iron(II) bromide ($FeBr_2$), iron(II) chloride ($FeCl_2$), iron(II)

iodide (FeI$_2$), iron(II)nitrite (Fe(NO$_3$)$_2$), iron(II) acetate ((C$_2$H$_3$O$_2$)$_2$Fe), potassium ferricyanide (II) K$_4$[Fe(CN)$_6$] and ferrocene;

Cerium salts, such as cerium(III) sulfate Ce$_2$(SO$_4$)$_3$;

Manganese salts, such as manganese(II) sulfate (MnSO$_4$);

Copper salts, such as copper(II) sulfate (CuSO$_4$), copper (II) bromide (CuBr$_2$), copper(II) chloride (CuCl$_2$), copper(II) iodide (CuI$_2$), copper(II) nitrite (Cu(NO$_3$)$_2$) and copper(II) acetate ((C$_2$H$_3$O$_2$)$_2$Cu);

Cobalt salts, such as cobalt(II) sulfate (CoSO$_4$), cobalt(II) bromide (CoBr$_2$), cobalt(II) chloride (CoCl$_2$), cobalt (II) iodide (CoI$_2$), cobalt(II) nitrite (Co((NO$_3$)$_2$) and cobalt(II) acetate ((C$_2$H$_3$O$_2$)$_2$C$_0$);

Chromium salts, such as chromium(III) sulfate (Cr$_2$(SO$_4$)$_3$), chromium (III) bromide (CrBr$_3$), chromium (III) chloride (CrCl$_3$), chromium(III) iodide (CrI$_3$), chromium(III) nitrite (Cr(NO$_3$)$_3$) and chromium(III) acetate((C$_2$H$_3$O$_2$)$_3$Cr).

In some embodiments, sodium bromide (NaBr) or ammonium bromide (NH$_4$Br) can be preferably used.

In some embodiments, environmental-friendly compounds such as iron salts can be preferably used. Among all iron salts, iron(II) sulphate (FeSO$_4$) is more preferable.

The concentration of the compound generating a mediator in reduced form in the solution is in the range of 0.01 mol/L to 1 mol/L and preferably 0.05 mol/L to 0.2 mol/L.

In the method according to the present invention, a mediator in reduced form is obtained when the compound above mentioned is dissolved in a solvent. It shall be understood by the skilled person that the mediator in reduced form is oxidized at the anode so as to obtain a mediator in oxidized form when the current is passed to the reactor. The mediator in oxidized form then oxidizes the amino acid and/or its salts, and simultaneously forms a mediator in reduced form, which can be same as or different from the mediator reduced form obtained when the compound is dissolved.

Examples of the mediator in reduced form are:

Halogen ions, such as Br$^-$, Cl$^-$ and I$^-$;

Metal ions, such as Fe$^{2+}$, Fe(CN)$_6^{4-}$, Mn$^{2+}$, MnO$_4^{2-}$, Ce$^{3+}$, Cr$^{3+}$ and Co$^{2+}$.

Examples of the mediator in oxidized form are:

Halogen ions, such as hypobromite (OBr$^-$), hypochloride (OCl$^-$) and hypoiodite (OI$^-$);

Metal ions, such as Fe$^{3+}$, Fe(CN)$_6^{3-}$, MnO$_4^{2-}$, MnO$_4$, Ce$^{4+}$, HCrO$_4^-$ and Co$^{3+}$.

As used herein, "amino acids" are the organic compounds which contain amine (—NH$_2$) and carboxyl (—COOH) functional groups, along with a side chain (R group) which is unique to each amino acid.

Preferably, the amino acid used in the method of the present invention is an alpha-amino acid.

Examples of the amino acid used in the method according to the present invention are lysine, cysteine, leucine, serine, tyrosine, arginine, histidine, isoleucine. The amino acid can notably have two amino functional groups, such as lysine.

The salt of amino acid is not particularly limited. It can notably be hydrochloride salt, hydrobromide salt or hydroiodide salt.

It should be understood that the amino acid and/or its salts is converted to corresponding nitrile or amine by oxidative decarboxylation. For example, amino acid reactant with general formula RCH(NH$_2$)COOH, the desired products are nitriles RCN or in certain cases amines RCH$_2$NH$_2$. The nitriles can be then hydrogenated to amines with full conversion by well-known methods.

Preferred examples of product amine are: 1, 5-diaminopentane, 3-methylbutan-1-amine, 1-(4-aminobutyl)guanidine, histamine, 2-methylbutan-1-amine, cysteamine, diaminoethyldisulfide, 2-aminoethanol.

Preferred examples of product nitrile are: 5-aminopentanitrile, glutaronitrile, 3-methylbutanenitrile, 1-(3-cyanopropyl)guanidine, 2-(1H-imidazol-4-yl)acetonitrile, 2-methylbutanenitrile, dicyanomethyldisulfide, 2-hydroxyacetonitrile.

pH value of the solution comprising the compound of formula (I), and the compound generating a mediator in reduced form depends on the mediator and is optionally adjusted by the skilled person. For example, pH value of the solution comprising compound of formula (I) and an iron salt shall be adjusted to below 4 and preferably below 3 to prevent the formation of iron(II)/(III) hydroxide. pH value of the solution comprising compound of formula (I) and an alkali metal bromide shall be adjusted to an acidic or slight basic solution to prevent the formation of the toxic Br$_2$ gas.

The conversion according to the present invention is carried out in such a preferred reactor comprising both an anode and a cathode.

The anode and/or the cathode preferably comprises a catalyst. The catalyst for the anode or the cathode may comprise metal element, which can be in the form of elemental metal, metal alloy, metal oxide or metal complex.

The anode catalyst may preferably comprise element selected from the group consisting of elements of Groups IIIA, IVA, VA of Periodic Table and Transition metals.

As used herein, metals of group IB, IIB, IIIB, IVB, VB, VIB, VIIB and VIIIB are often referred to as transition metals. This group comprises the elements with atomic number 21 to 30 (Sc to Zn), 39 to 48 (Y to Cd), 72 to 80 (Hf to Hg) and 104 to 112 (Rf to Cn).

Examples of the anode catalyst are notably:

Elemental metal comprise element selected from the group consisting of Pd, Pt, Ru, Au, Rh, Ir, Bi, Sn, B and any combination thereof.

Metal alloy, such as Pd—Au, Pd—B and Pt—Ru.

Preferably, the anode catalyst is Pt.

The cathode catalyst may preferably comprise element selected from the group consisting of elements of Groups IA, IIA, IIIA, IVA, VA, VIA, VIIA of Periodic Table, Transition metals and Lanthanides.

Examples of the cathode catalyst are notably:

Elemental metal comprise element selected from the group consisting of Pt, Ni, Cu, C and any combination thereof.

Preferably, the cathode catalyst is Ni or Cu and more preferably Cu.

The catalyst for the anode or the cathode above mentioned can be loaded on a support. The support is not particularly limited. Typical examples of support are carbon, alumina and silica.

In one embodiment, the anode or the cathode may comprise a catalyst mentioned above and a substrate.

Preferably, the anode and the cathode can be made with porous substrate structures.

The anode substrates can include, for example, stainless steel net, nickel foam, sintered nickel powder, etched aluminum-nickel mixtures, carbon fibers, and carbon cloth. Preferably, carbon materials and stainless steel are used as an anode substrate.

The cathode substrates can include stainless steel, nickel foam, sintered nickel powder, etched aluminum-nickel mixtures, metal screens, carbon fibers, and carbon cloth.

Methods for applying the anode catalyst to the anode substrate, and the cathode catalyst to the cathode substrate include, for example, spreading, wet spraying, powder deposition, electro-deposition, evaporative deposition, dry spraying, decaling, painting, sputtering, low pressure vapor deposition, electrochemical vapor deposition, tape casting, screen printing, hot pressing and other methods.

When substrates are used, preferred range of the catalyst loading may be comprised between 0.01 mg/cm$^{-2}$ and 500 mg/cm$^{-2}$. More preferably, the catalyst loading amount may be comprised between 1 mg/cm$^{-2}$ and 20 mg/cm$^{-2}$.

In one embodiment, the electrochemical reactor used in the method according to the invention has two independent compartments. The anode and the cathode reside in these two compartments separately. A membrane can be placed between the two compartments. Said membrane can be neutral or ion-exchange membrane. Preferably, the membrane is a nafion (a sulfonated tetrafluoroethylene based fluoropolymer-copolymer) cation exchange membrane.

Advantageously, the distance between the anode and the cathode is in the range of 1 mm to 10 cm and preferably 3 mm to 1 cm.

Preferably, the reaction temperature can be from 0° C. to 100° C. and more preferably from 10° C. to 50° C. and most preferably room temperature.

According to the present invention, room temperature is between 15° C. and 25° C.

Preferably, the reaction can be run at a current density ranging from 0.1 mA/cm$^2$ to 150 mA/cm$^2$ and preferably from 10 mA/cm$^2$ to 20 mA/cm$^2$.

Preferably, the reaction can be run at a potential ranging from 0.0001 V to 10 V and more preferably from 1.5 V to 4 V.

The skilled person will use the proper reaction time based on the reaction parameters above mentioned. The reaction time can be from 10 h to 100 h and preferably 10 h to 80 h.

The following examples are included to illustrate embodiments of the invention. Needless to say, the invention is not limited to the described examples.

EXPERIMENTAL PART

Materials
Sodium bromide: CAS No 7647-15-6 from Sigma-Aldrich
Iron(II) sulfate heptahydrate: CAS No 7782-63-0 from Sigma-Aldrich
L-lysine monohydrochloride: CAS No 657-27-2 from Sigma-Aldrich
Sulfuric acid: CAS No 7664-93-9 from Sinopharm Example 1 (Comparative Example)

As batch reactor, a 10 ml glass vessel (diameter 2.5 cm) is used. A Pt coil (coil=0.5 cm high, 1 cm diameter, circumference=3.1 cm, surface area=1.6 cm$^2$) serves as anode. As cathode a Ni foam is bent into cylindrical shape (Size=5.5 cm×5.5 cm—long enough to reach out of the reactor). It is bend in a cylindrical shape and wrapped around a cylindrical foam (diameter=2 cm). The cathode surface area=5.5 cm×0.5 cm (Pt coil height)=2.75 cm$^2$. The Pt wire above the coil is insulated by a PTFE tube in order to prevent echem reactions at the wire and pierced through the spacer to keep the Pt electrode in place. The Ni cathode leaves a gap open to be able to see the Pt coil. The distance between both electrodes is 3 mm No reference electrode and no stirring are used.

The reactor is filled with 6 ml of a solution of lysine monohydrochloride (0.14 M) and NaBr (0.19 M). The measured pH is around 6.

Reaction parameters: The total experiment time: 7 h, current=41 mA (equals a current density of 15 mA/cm$^2$ at anode).

During reaction, samples are taken and analyzed by NMR. The results are summarized in Table 1.

Example 2 (Bromide Mediator, 0.28 M Lysine Monohydrochloride, Ni Cathode)

As batch reactor, a 10 ml glass vessel (diameter 2.5 cm) is used. A Pt coil (coil=0.5 cm high, 1 cm diameter, circumference=3.1 cm, surface area=1.6 cm$^2$) serves as anode. As cathode a Ni foam is bent into cylindrical shape (Size=5.5 cm×5.5 cm—long enough to reach out of the reactor). It is bend in a cylindrical shape and wrapped around a cylindrical foam (diameter=2 cm). The cathode surface area=5.5 cm×0.5 cm (Pt coil height)=2.75 cm$^2$. The Pt wire above the coil is insulated by a PTFE tube in order to prevent echem reactions at the wire and pierced through the spacer to keep the Pt electrode in place. The Ni cathode leaves a gap open to be able to see the Pt coil. The distance between both electrodes is 3 mm No reference electrode and no stirring are used.

The reactor is filled with 5 ml lysine monohydrochloride (0.28 M) and NaBr (0.14 M). The measured pH is around 6.

Reaction parameters: The total experiment time: 14 h, current=41 mA (equals a current density of 15 mA/cm$^2$ at anode).

During reaction, samples are taken and analyzed by NMR. The results are summarized in Table 1.

Example 3 (Bromide Mediator, 1 M Lysine Monohydrochloride, Ni Cathode)

As batch reactor, a 10 ml glass vessel (diameter 2.5 cm) is used. A Pt coil (coil=0.5 cm high, 1 cm diameter, circumference=3.1 cm, surface area=1.6 cm$^2$) serves as anode. As cathode a Ni foam is bent into cylindrical shape (Size=5.5 cm×5.5 cm—long enough to reach out of the reactor). It is bend in a cylindrical shape and wrapped around a cylindrical foam (diameter=2 cm). The cathode surface area=5.5 cm×0.5 cm (Pt coil height)=2.75 cm$^2$. The Pt wire above the coil is insulated by a PTFE tube in order to prevent echem reactions at the wire and pierced through the spacer to keep the Pt electrode in place. The Ni cathode leaves a gap open to be able to see the Pt coil. The distance between both electrodes is 3 mm No reference electrode and no stirring are used.

The reactor is filled with 5 ml lysine monohydrochloride (1 M) and NaBr (0.14 M). The measured pH is around 6.

Reaction parameters: The total experiment time: 72 h, current=41 mA (current density=15 mA/cm$^2$).

During reaction, samples are taken and analyzed by NMR. The results are summarized in Table 1.

Example 4 (Bromide Mediator, 2 M Lysine Monohydrochloride (Saturated), Cu Cathode)

As batch reactor, a 10 ml glass vessel (diameter 2.5 cm) is used. A Pt coil (height=1.5 cm, diameter=1 cm, circumference=3.1 cm, surface area=4.7 cm$^2$) serves as anode. As cathode a Cu foam is bent into cylindrical shape (Size=5.5 cm×5.5 cm—long enough to reach out of the reactor). It is bend in a cylindrical shape and wrapped around a cylindrical foam (diameter=2 cm). The cathode surface area=5.5 cm×0.5 cm (Pt coil height)=2.75 cm$^2$. The Pt wire above the coil is insulated by a PTFE tube in order to prevent echem reactions at the wire and pierced through the spacer to keep the Pt electrode in place. The Cu cathode leaves a gap open to be able to see the Pt coil. The distance between both electrodes is 3 mm No reference electrode and no stirring are used.

The reactor is filled with 8 ml lysine monohydrochloride (2 M) and NaBr (0.2 M). The measured pH is around 6.

Reaction parameters: The total experiment time: 31 h, current=113 mA (15 mA/cm$^2$).

During reaction, samples are taken and analyzed by NMR. The results are summarized in Table 1.

Example 5 (Fe$^{3+}$/Fe$^{2+}$ Mediator, 1 M Lysine Monohydrochloride, Cu Cathode)

As batch reactor, a 20 ml glass reactor is used. A Pt cylindrical mesh (height=2 cm, diameter=1 cm, circumference=3.1 cm, surface area=6.3 cm$^2$) serves as anode. As cathode a Cu foam is bent into cylindrical shape (thickness=2 cm, size=4 cm×8 cm—long enough to reach out of the reactor). It is bend in a cylindrical shape and wrapped around a cylindrical polymer foam (diameter=2 cm). The cathode surface area=4 cm×2 cm (Pt coil height)=8 cm$^2$. The Pt wire above the coil is insulated by a PTFE tube in order to prevent electrochemical reactions at the wire and is pierced through the spacer to keep the Pt electrode in place. The Cu cathode leaves a gap open to be able to see the Pt electrode.

No reference electrode and no stirring are used. The distance between both electrodes is 3 mm The reactor is filled with 10 ml reaction solution containing 1 M lysine monohydrochloride and 0.14 M iron-sulfate heptahydrate. During the preparation of the 10 ml solution, the pH is adjusted to 1 with 1 M sulfuric acid.

Reaction parameters: total reaction time is 96 h. Current=120 mA (equivalent to a current density of 15 mA/cm$^2$ at the anode).

During reaction, samples are taken and analyzed by NMR. The results are summarized in Table 1.

The invention claimed is:

1. A method for forming an amine and/or a nitrile comprising:
   electrochemically converting an amino acid and/or its salts to an amine and/or a nitrile in a solvent, and
   transferring an electron from a compound thereby generating a mediator in reduced form in the solvent,
   wherein
   the amino acid and/or its salts in the solvent are present in a concentration that is equal to or greater than 0.15 mol/L and the compound is an iron salt.

2. The method according to claim 1, wherein the amino acid and/or its salts are present in a concentration ranging from 0.15 mol/L to 2 mol/L.

3. The method according to claim 2, wherein the amino acid and/or its salts are present in a concentration ranging from 0.50 mol/L to 1.0 mol/L.

4. The method according to claim 1, wherein the compound is present in a concentration ranging from 0.01 mol/L to 1 mol/L.

5. The method according to claim 4, wherein the compound is present in a concentration ranging from 0.05 mol/L to 0.2 mol/L.

6. The method according to claim 1, wherein the amino acid is selected from the group consisting of lysine, cysteine, leucine, serine, tyrosine, arginine, histidine and isoleucine.

7. The method according to claim 1, wherein the salt of amino acid is selected from the group consisting of hydrochloride salt, hydrobromide salt and hydroiodide salt.

8. The method according to claim 1, wherein the conversion is carried out in a reactor comprising both an anode and a cathode separated by a distance in the range of 1 mm to 10 cm.

9. The method according to claim 8, wherein the distance separating the anode and the cathode is in the range of 3 mm to 1 cm.

10. The method according to claim 8, wherein the reactor further comprises an anode catalyst and/or a cathode catalyst.

11. The method according to claim 10, wherein the anode catalyst is Pt and the cathode catalyst is Ni or Cu.

TABLE 1

| | Reactant Conz | Mediator Conz | APN | DAP | APA | Glutaronitrile | other | APN + DAP + Glutaronitrile |
|---|---|---|---|---|---|---|---|---|
| EX 1 | 0.14M | 0.14 M NaBr | 65% | 18% | 14% | 3% | 0% | 86% |
| EX 2 | 0.28M | 0.14 M NaBr | 72% | 20% | 5% | 2% | 1% | 94% |
| EX 3 | 1M | 0.14 M NaBr | 84% | 14% | 2% | 1% | 0% | 98% |
| EX 4 | 2M | 0.2 M NaBr | 42% | 45% | 0 | 8% | 5% | 95% |
| EX 5 | 1M | 0.14 M FeSO$_4$ | 62% | 32% | 1% | 0% | 5% | 94% |

Conversion = 100%. Examples, 2 and 3 use of Ni cathode. Examples 4 and 5 use of Cu
APN = 5-aminopentanitrile
DAP = 1, 5-diaminopentane
APA = aminopentanamide

12. The method according to claim 1, wherein the iron salt is iron (II) sulphate.

\* \* \* \* \*